(12) United States Patent
Atherton et al.

(10) Patent No.: US 10,427,305 B2
(45) Date of Patent: Oct. 1, 2019

(54) ROBOTIC CAMERA CONTROL VIA MOTION CAPTURE

(71) Applicant: Autodesk, Inc., San Rafael, CA (US)

(72) Inventors: Evan Patrick Atherton, San Carlos, CA (US); David Thomasson, Fairfax, CA (US); Maurice Ugo Conti, Muir Beach, CA (US); Heather Kerrick, Oakland, CA (US)

(73) Assignee: AUTODESK, INC., San Rafael, CA (US)

( * ) Notice: Subject to any disclaimer, the term of this patent is extended or adjusted under 35 U.S.C. 154(b) by 173 days.

(21) Appl. No.: 15/216,583

(22) Filed: Jul. 21, 2016

(65) Prior Publication Data

US 2018/0021956 A1  Jan. 25, 2018

(51) Int. Cl.
  *G05B 15/00*  (2006.01)
  *B25J 9/16*  (2006.01)
  (Continued)

(52) U.S. Cl.
  CPC .......... *B25J 9/1697* (2013.01); *B25J 9/1664* (2013.01); *B25J 9/1679* (2013.01); *B25J 19/023* (2013.01);
  (Continued)

(58) Field of Classification Search
  CPC ...... B25J 9/1697; B25J 19/023; B25J 9/1664; B25J 9/1679; B25J 9/16; B25J 11/009; B25J 9/0084; B25J 9/163; B25J 9/1661; B25J 9/1674; B25J 13/00; B25J 9/1689; B25J 19/021; G05D 1/0016; G06K 9/00342; H04N 5/23203; G05B 2219/35444; G05B 2219/40413; G05B 19/42; G05B 2219/36429; G05B 2219/39478; G05B 2219/40264; G05B 2219/40391; G05B 2219/40411; G05B 2219/32014; G05B 2219/40002; G05B 2219/40116; G06F 3/017; G06F 3/011; G06F 3/005; G06F 3/0304;
  (Continued)

(56) References Cited

U.S. PATENT DOCUMENTS 6,016,385 A * 1/2000 Yee .......................... B25J 3/04
                                                    700/245
7,787,992 B2 * 8/2010 Pretlove ................. G06F 3/011
                                                    700/259
(Continued)

FOREIGN PATENT DOCUMENTS

CN           105223957 A      1/2016

OTHER PUBLICATIONS

International Search Report for Application No. PCT/US2017/043118 dated Oct. 20, 2017.

*Primary Examiner* — Khoi H Tran
*Assistant Examiner* — Jorge O Peche
(74) *Attorney, Agent, or Firm* — Artegis Law Group, LLP

(57) ABSTRACT

A motion capture setup records the movements of an operator, and a control engine then translates those movements into control signals for controlling a robot. The control engine may directly translate the operator movements into analogous movements to be performed by the robot, or the control engine may compute robot dynamics that cause a portion of the robot to mimic a corresponding portion of the operator.

17 Claims, 5 Drawing Sheets

(51) Int. Cl.
  *B25J 19/02*   (2006.01)
  *G06K 9/00*    (2006.01)
  *H04N 5/232*   (2006.01)
  *G05D 1/00*    (2006.01)
  *G06T 7/246*   (2017.01)
  *G06F 3/01*    (2006.01)
  *H04N 5/247*   (2006.01)

(52) U.S. Cl.
  CPC ....... *G05D 1/0016* (2013.01); *G06K 9/00342* (2013.01); *G06T 7/251* (2017.01); *H04N 5/23203* (2013.01); *B25J 9/16* (2013.01); *G05B 2219/35444* (2013.01); *G06F 3/017* (2013.01); *G06T 2207/30196* (2013.01); *H04N 5/247* (2013.01)

(58) Field of Classification Search
  CPC ......... G06T 2207/30196; G06T 1/0014; Y10S 901/03; Y10S 901/47
  See application file for complete search history.

(56) References Cited

U.S. PATENT DOCUMENTS

| | | | |
|---|---|---|---|
| 8,265,791 B2* | 9/2012 | Song | B25J 9/1664 700/250 |
| 8,878,779 B2* | 11/2014 | Givon | G06F 3/017 345/156 |
| 9,056,396 B1* | 6/2015 | Linnell | G05B 19/427 |
| 9,446,510 B2* | 9/2016 | Vu | B25J 5/007 |
| 9,643,314 B2* | 5/2017 | Guerin | B25J 9/1605 |
| 9,925,669 B2* | 3/2018 | Linnell | G05B 19/427 |
| 2005/0131580 A1* | 6/2005 | Kurzweil | B25J 13/00 700/245 |
| 2005/0177276 A1* | 8/2005 | Morel | B25J 9/1671 700/245 |
| 2007/0124024 A1* | 5/2007 | Okamoto | B25J 5/007 700/245 |
| 2008/0316368 A1* | 12/2008 | Fritsch | H04N 5/23203 348/722 |
| 2009/0271038 A1* | 10/2009 | Song | B25J 9/1664 700/259 |
| 2010/0087955 A1* | 4/2010 | Tsusaka | B25J 9/0003 700/245 |
| 2010/0114371 A1* | 5/2010 | Tsusaka | B25J 9/0003 700/250 |
| 2010/0204828 A1* | 8/2010 | Yoshizawa | B25J 9/1666 700/245 |
| 2010/0222925 A1* | 9/2010 | Anezaki | G05D 1/0221 700/253 |
| 2010/0235034 A1* | 9/2010 | Higgins | G05D 1/0083 701/28 |
| 2010/0286826 A1* | 11/2010 | Tsusaka | B25J 9/1633 700/254 |
| 2011/0015785 A1* | 1/2011 | Tsusaka | B25J 9/0003 700/254 |
| 2011/0058800 A1* | 3/2011 | Lee | G03B 11/00 396/73 |
| 2011/0106311 A1* | 5/2011 | Nakajima | B25J 9/1697 700/253 |
| 2011/0190932 A1* | 8/2011 | Tsusaka | B25J 13/08 700/254 |
| 2011/0208355 A1* | 8/2011 | Tsusaka | B25J 9/1664 700/246 |
| 2012/0072023 A1* | 3/2012 | Ota | B25J 9/1664 700/259 |
| 2012/0173018 A1* | 7/2012 | Allen | G05D 1/0248 700/245 |
| 2012/0185095 A1* | 7/2012 | Rosenstein | B25J 5/007 700/259 |
| 2012/0277898 A1* | 11/2012 | Kawai | B25J 5/02 700/114 |
| 2013/0010081 A1* | 1/2013 | Tenney | A61B 34/30 348/47 |
| 2013/0054028 A1* | 2/2013 | Lee | B25J 9/1689 700/259 |
| 2013/0245824 A1* | 9/2013 | Barajas | B25J 9/1664 700/253 |
| 2013/0310977 A1* | 11/2013 | Tsusaka | B25J 9/1656 700/257 |
| 2014/0064601 A1* | 3/2014 | Ramachandran | B25J 9/1697 382/153 |
| 2014/0067317 A1* | 3/2014 | Kobayashi | B25J 9/1697 702/153 |
| 2014/0163736 A1* | 6/2014 | Azizian | A61B 6/102 700/259 |
| 2015/0032254 A1* | 1/2015 | Ishiguro | B25J 1/0005 700/245 |
| 2015/0217444 A1* | 8/2015 | Asada | B25J 5/00 700/258 |
| 2015/0290795 A1* | 10/2015 | Oleynik | G05B 19/42 700/257 |
| 2015/0314442 A1* | 11/2015 | Boca | B25J 9/1664 700/253 |
| 2016/0059419 A1* | 3/2016 | Suzuki | B25J 9/1697 700/114 |
| 2016/0227193 A1* | 8/2016 | Osterwood | G01S 17/42 |
| 2016/0250751 A1* | 9/2016 | Martinson | B25J 9/1674 700/253 |
| 2016/0257000 A1* | 9/2016 | Guerin | B25J 9/1605 |
| 2017/0039671 A1* | 2/2017 | Seo | H04N 5/23229 |
| 2017/0131102 A1* | 5/2017 | Wirbel | G05D 1/0272 |
| 2017/0181802 A1* | 6/2017 | Sachs | A61B 17/00234 |
| 2017/0203438 A1* | 7/2017 | Guerin | B25J 9/1605 |
| 2017/0255301 A1* | 9/2017 | Norton | B25J 13/02 |
| 2017/0269586 A1* | 9/2017 | D'Andrea | A63H 30/04 |
| 2017/0320210 A1* | 11/2017 | Ding | B25J 9/163 |
| 2017/0348854 A1* | 12/2017 | Oleynik | B25J 9/1605 |
| 2018/0021956 A1* | 1/2018 | Atherton | B25J 9/1664 |
| 2018/0046152 A1* | 2/2018 | Fujita | B25J 9/161 |
| 2018/0161987 A1* | 6/2018 | Linnell | G05B 19/427 |
| 2018/0354130 A1* | 12/2018 | Preisinger | B25J 9/1664 |
| 2019/0105779 A1* | 4/2019 | Einav | B25J 9/1676 |

* cited by examiner

ROBOTIC CAMERA CONTROL VIA MOTION CAPTURE

BACKGROUND OF THE INVENTION

Field of the Invention

Embodiments of the present invention relate generally to robotics and, more specifically, to robotic camera control via motion capture.

Description of the Related Art

When filming a movie, a camera operator controls the position, orientation, and motion of a camera in order to frame shots, capture sequences, and transition between camera angles, among other cinematographic procedures. However, operating a camera can be difficult and/or dangerous in certain situations. For example, when filming a close-up sequence, the camera operator may be required to assume an awkward position for an extended period of time while physically supporting heavy camera equipment. Or, when filming an action sequence, the camera operator may be required to risk bodily injury in order to attain the requisite proximity to the action being filmed. In any case, camera operators usually must perform very complex camera movements and oftentimes must repeat these motions across multiple takes.

As the foregoing illustrates, what is needed in the art are more effective approaches to filming movie sequences.

SUMMARY OF THE INVENTION

Various embodiments of the present invention set forth a computer-implemented method for controlling a robot, including generating motion capture data based on one or more movements of an operator, processing the motion capture data to generate control signals for controlling the robot, and transmitting the control signals to the robot to cause the robot to mimic the one or more movements of the operator.

At least one advantage of the approach discussed herein is that a human camera operator need not be subjected to discomfort or bodily injury when filming movies.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
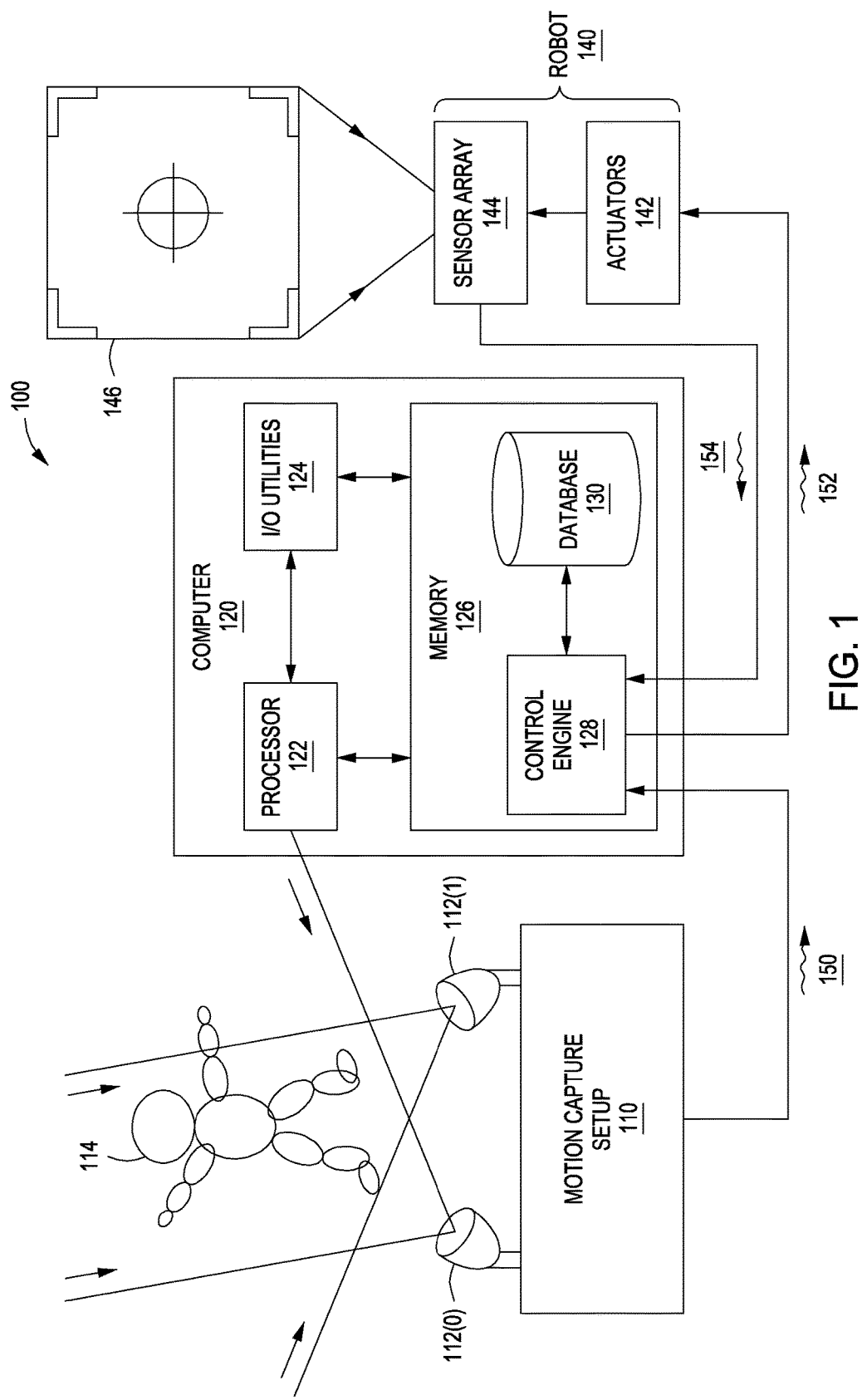
FIG. 1 illustrates a system configured to implement one or more aspects of the present invention.

FIG. 1 illustrates a system configured to implement one or more aspects of the present invention. As shown, system 100 includes a motion capture setup 110, a computer 120, and a robot 140. Motion capture setup 110 is coupled to computer 120, and computer 120 is coupled to robot 140.

Motion capture setup 110 includes sensors 112(0) and 112(1), configured to a capture motion associated with an operator 114. Motion capture setup 110 may include any number of different sensors, although generally motion capture setup 110 includes at least two sensors 112 in order to capture binocular data. Motion capture setup 110 outputs motion capture data 150 to computer 120 for processing.

Computer 120 includes a processor 122, input/output (I/O) utilities 124, and a memory 126, coupled together. Processor 122 may be any technically feasible form of processing device configured process data and execute program code. Processor 112 could be, for example, a central processing unit (CPU), a graphics processing unit (GPU), an application-specific integrated circuit (ASIC), a field-programmable gate array (FPGA), any technically feasible combination of such units, and so forth. I/O utilities 124 may include devices configured to receive input, including, for example, a keyboard, a mouse, and so forth. I/O utilities 124 may also include devices configured to provide output, including, for example, a display device, a speaker, and so forth. I/O utilities 124 may further include devices configured to both receive and provide input and output, respectively, including, for example, a touchscreen, a universal serial bus (USB) port, and so forth.

Memory 126 may be any technically feasible storage medium configured to store data and software applications. Memory 126 could be, for example, a hard disk, a random access memory (RAM) module, a read-only memory (ROM), and so forth. Memory 126 includes a control engine 128 and database 130. Control engine 128 is a software application that, when executed by processor 122, causes processor 122 to interact with robot 140.

Robot 140 includes actuators 142 coupled to a sensor array 144. Actuators 142 may be any technically feasible type of mechanism configured to induce physical motion of any kind, including linear or rotational motors, hydraulic or pneumatic pumps, and so forth. In one embodiment (described by way of example in conjunction with FIG. 3), actuators 142 include rotational motors configured to articulate a robotic arm of robot 140. In another embodiment (described by way of example in conjunction with FIG. 4), actuators 142 include rotational motors configured to drive a set of propellers that propel robot 140 through the air.

Sensor array 144 may include any technically feasible collection of sensors. For example, sensor array 144 could include an optical sensor, a sonic sensor, and/or other types of sensors configured to measure physical quantities. Generally, sensor array 144 is configured to record multimedia data. In practice, sensor array 144 includes a video camera configured to capture a frame 146. By capturing a sequence of such frames, sensor array 144 may record a movie.

In operation, motion capture setup 110 captures motion associated with operator 114 and then transmits motion capture signals 150 to control engine 128. Control engine 128 processes motion capture signals 150 to generate control signals 152. Control engine 128 transmits control signals 152 to robot 140 to control the motion of robot 140 via actuators 140. In general, the resultant motion of robot 140 mimics and/or is derived from the motion of operator 114. Robot 140 receives sensor data 154 via sensor array 146 and transmits that sensor data to control engine 128. Control engine 128 may process the received data for storage in database 130.

In this manner, operator 114 may control robot 140 to capture video sequences without being required to physically and/or directly operate any camera equipment. One advantage of this approach is that operator 114 need not be subjected to a difficult and/or dangerous working environment when filming. Control engine 128 is described in greater detail below in conjunction with FIG. 2.

Figure 2:
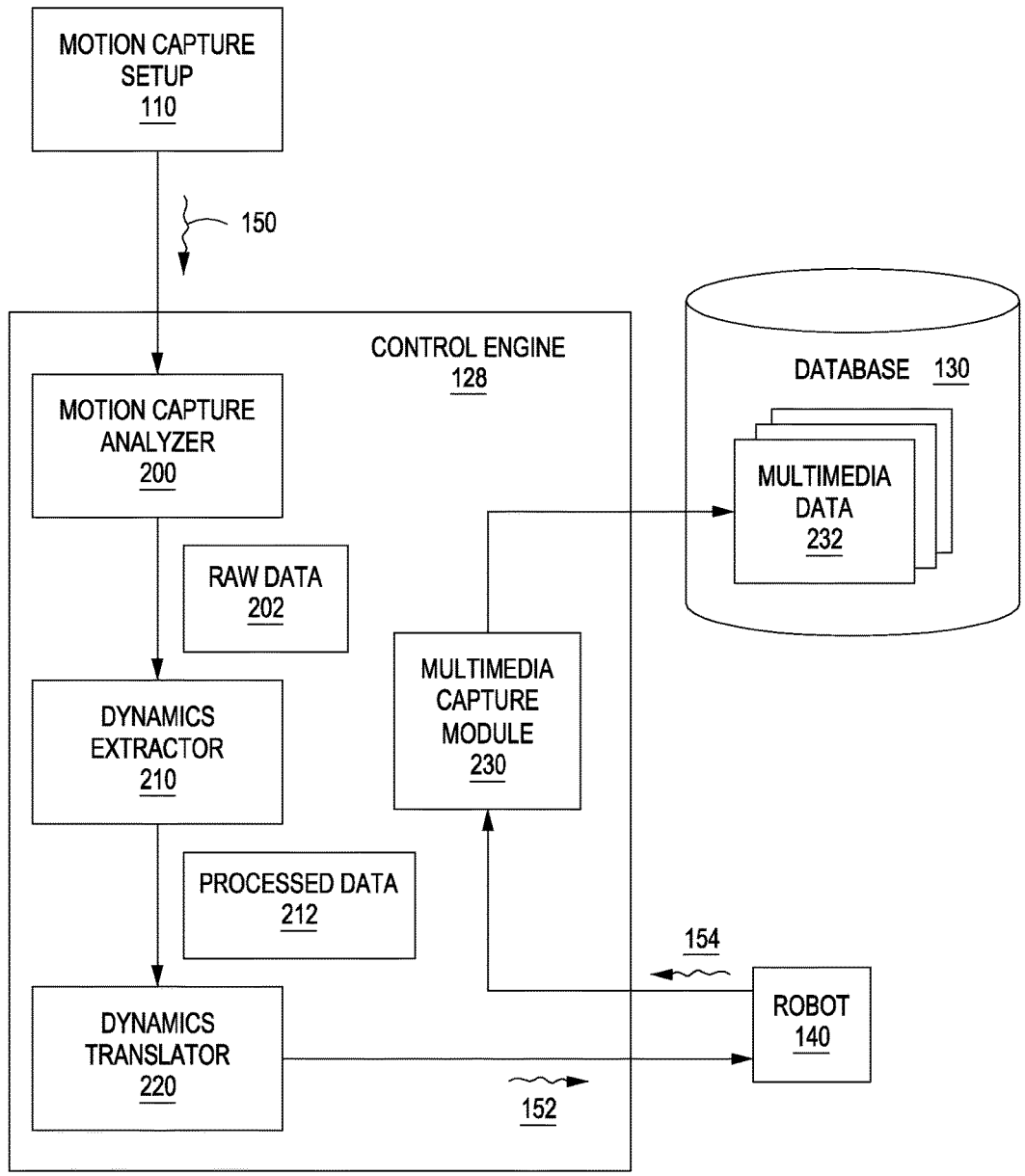
FIG. 2 is a more detailed illustration of the control engine of FIG. 1, according to various embodiments of the present invention.

FIG. 2 is a more detailed illustration of the control engine of FIG. 1, according to various embodiments of the present invention. As shown, control engine 128 includes motion capture analyzer 200, dynamics extractor 210, dynamics translator 220, and multimedia capture module 230.

Motion capture analyzer 200 is configured to receive motion capture signals 150 from motion capture setup 110 and to process those signals to generate raw data 202. Motion capture signals 150 generally include video data captured by sensors 112. Motion capture analyzer 200 processes this video data to identify the position and orientation of some or all of operator 114 over a time period. In one embodiment, operator 114 wears a suit bearing reflective markers that can be tracked by motion capture analyzer 200. Motion capture analyzer 200 may be included in motion capture setup 110 in certain embodiments. Motion capture analyzer 200 generates raw data 202, which includes a set of quantities describing the position and orientation of any tracked portions of operator 114 over the time period.

Dynamics extractor 210 receives raw data 202 and then processes this data to generate processed data 212. In doing so, dynamics extractor 210 models the dynamics of operator 114 over the time period based on raw data 202. Dynamics extractor 210 may determine various rotations and/or translations of portions of operator 114, including the articulation of the limbs of operator 114, as well as the trajectory of any portion of operator 114 and/or any object associated with operator 114. Dynamics extractor 220 provides processed data 212 to dynamics translator 220.

Dynamics translator 220 is configured to translate the modeled dynamics included in processed data 212 into control signals 152 for controlling robot 140 to have dynamics derived from the modeled dynamics. Dynamics translator 220 may generate some control signals 152 that cause robot 140 to directly mimic the dynamics and motion of operator 114, or may generate other control signals 152 to cause only a portion of robot 140 to mimic the dynamics and motion of operator 114.

For example, dynamics translator 220 could generate control signals 152 that cause actuators 142 within a robotic arm of robot 140 to copy the articulation of joints within an arm of operator 114. This particular example is described in greater detail below in conjunction with FIG. 3. Alternatively, dynamics translator 220 could generate control signals 152 that cause actuators 142 to perform any technically feasible set of actuations in order to cause sensor array 144 to trace a similar path as an object held by operator 114. This example is described in greater detail below in conjunction with FIG. 4. In one embodiment, dynamics translator 220 may also amplify the movements of operator 114 when generating control signals 152, so that the dynamics of robot 140 represent an exaggerated version of the dynamics of operator 114.

In response to control signals 152, actuators 142 within robot 140 actuate and move sensor array 144 (and potentially robot 140 as a whole). Sensor array 144 captures sensor data 154 and transmits this data to multimedia capture module 230 within control engine 128. Multimedia capture application 230 generally manages the operation of sensor array and processes incoming sensor signals such as sensor signals 154. Based on these signals, multimedia capture module 230 generates multimedia data 232 for storage in database 130. Multimedia data 232 may include any technically feasible type of data, although in practice multimedia data 232 includes frames of video captured by sensor array 144, and possibly frames of audio data as well.

As a general matter, control engine 128 is configured to translate movements performed by operator 114 into movements performed by robot 140. In this manner, operator 114 can control robot 140 by performing a set of desired movements. This approach may be specifically applicable to filming a movie, where a camera operator may wish to control robot 140 to film movie sequences in a particular manner. However, persons skilled in the art will understand that the techniques disclosed herein for controlling a robot may be applicable to other fields beyond cinema.

Exemplary Robot Control Via Motion Capture

Figure 3:
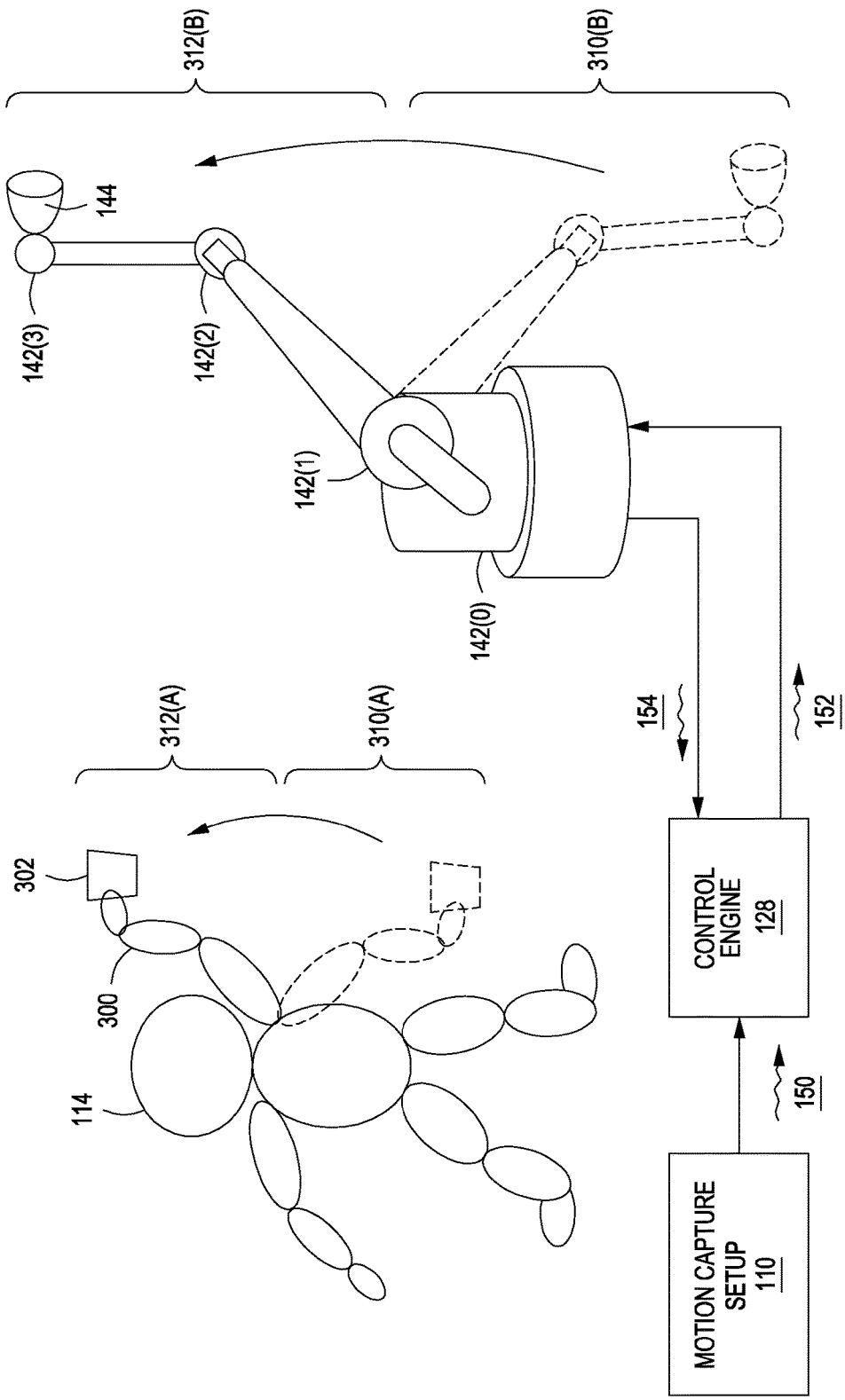
FIG. 3 illustrates how the articulation of a robotic arm can be controlled via a motion capture setup, according to various embodiments of the present invention.

FIG. 3 illustrates how the articulation of a robotic arm can be controlled via a motion capture setup, according to various embodiments of the present invention. The scenario depicted in FIG. 3 is provided for exemplary purposes only to illustrate one possible robot and one possible set of movements. The techniques described herein are applicable to any technically feasible robot and any technically feasible set of movements.

As shown, operator 114 moves arm 300 from a position 310(A) upwards to assume a position 312(A). Operator 114 may optionally hold a motion capture object 302. Motion capture setup 110 is generally configured to track the motion of operator 114, and, specifically, to track the articulation of joints in arm 300 of operator 114. In one embodiment, motion capture setup 110 relies on markers indicating the positions of joints of arm 300. Motion capture setup 110 may also track the position and location of motion capture object 302. Motion capture setup 110 transmits motion capture signals 150 to control engine 128 that represent any and all captured data.

Control engine 128 then generates control signals 152 to cause robot 140 to move from position 310(B) to position 312(B). Positions 310(A) and 310(B) are generally analogous and have a similar articulation of joints. Likewise, positions 312(A) and 312(B) are analogous and have a similar articulation of joints. Additionally, any intermediate positions are generally analogous. Robot 140 may effect these analogous articulations by actuating actuators 142(0), 142(1), 142(2), and 142(3) to perform similar joint rotations as those performed by operator 114 with arm 300. In this manner, robot 140 performs a movement that is substantially the same as the movement performed by operator 114. In some embodiments, the motion of robot 140 represents an exaggerated version of the motion of operator 114. For example, control engine 128 could scale the joint rotations associated with arm 300 by a preset amount when generating control signals 152 for actuators 142 or perform a smoothing operation to attenuate disturbances and/or other perturbations in the mimicked movements.

During motion, sensor array 144 captures data that is transmitted to control engine 128 as sensor data 154. This sensor data is gathered from a sequence of locations that operator 114 indicates by performing movements corresponding to those locations, as described. In some cases, though, robot 140 need not implement analogous dynamics as operator 114. In particular, when operator 114 moves motion control object 302 along a certain path, robot 140 may perform any technically feasible combination of movements in order to cause sensor array 144 to trace a similar path. This approach is described in greater detail below in conjunction with FIG. 4.

Figure 4:
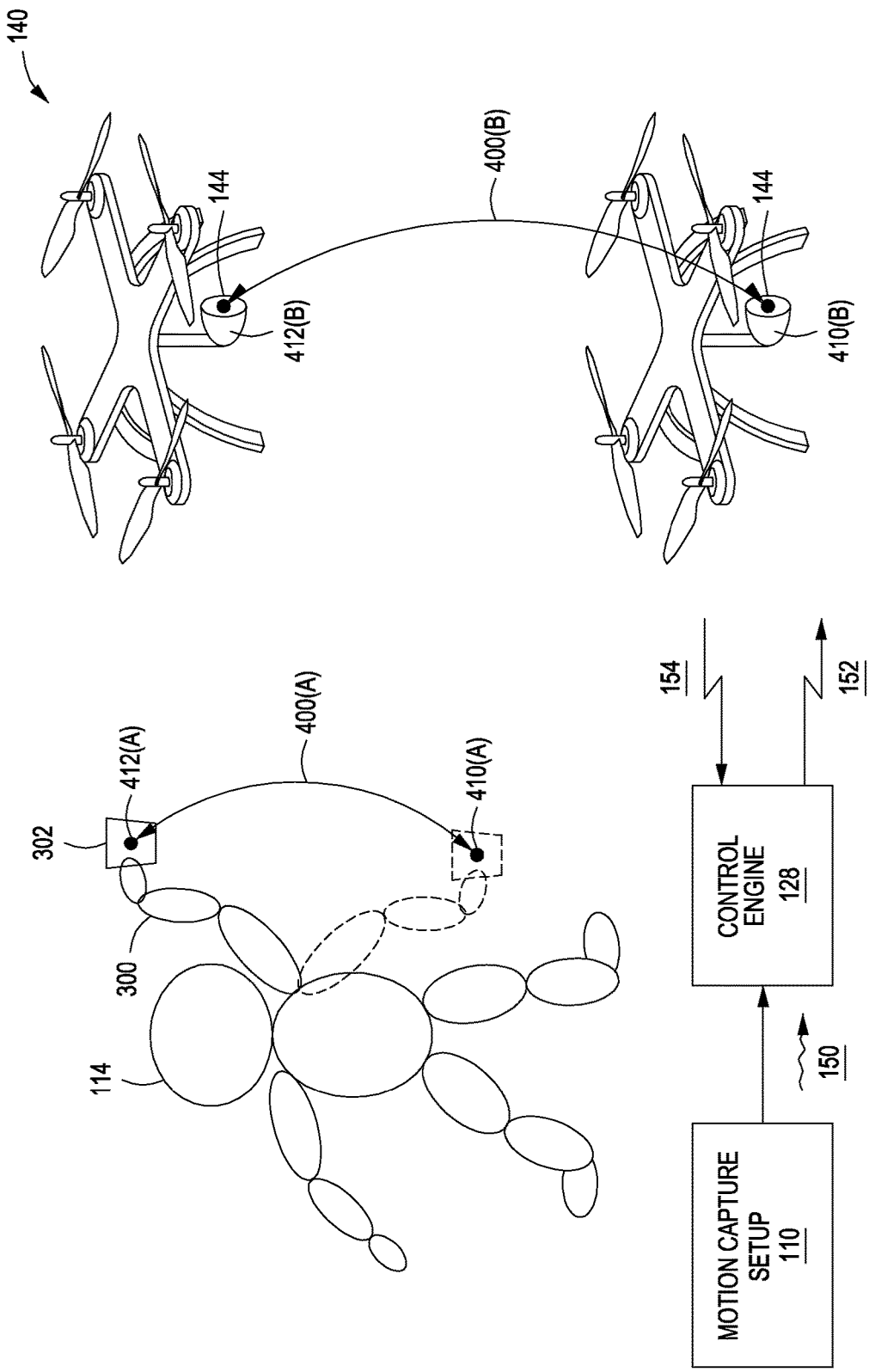
FIG. 4 illustrates how the position and orientation of a robotic drone can be controlled via a motion capture setup, according to various embodiments of the present invention.

FIG. 4 illustrates how the position of a robotic drone can be controlled via a motion capture setup, according to various embodiments of the present invention. Similar to FIG. 3, the scenario depicted in FIG. 4 is provided for exemplary purposes only to illustrate one possible robot and one possible set of movements. The techniques described herein are applicable to any technically feasible robot and any technically feasible set of movements.

In FIG. 4, operator 114 moves motion capture object 302 along trajectory 400(A) from initial position 410(A) to final position 412(A). In doing so, operator 114 articulates arm 300, in like fashion as described above in conjunction with FIG. 3. However, in the exemplary scenario shown in FIG. 4, motion capture setup 110 need not capture the specific articulation or arm 300.

Instead, motion capture setup 110 tracks the trajectory of motion capture object 302 to generate motion capture signals 150. Based on motion capture signals 150, control engine 128 determines specific dynamics for robot 140 that cause sensor array 144 to traverse a trajectory that is analogous to trajectory 400(A). Control engine 128 generates control signals 152 that represent these dynamics and then transmits control signals 152 to robot 140 for execution. In response, robot 140 moves sensor array 144 along trajectory 400(B) from position 410(A) to position 410(B).

Depending on the type of robot implemented, control engine 128 may generate different control signals 152. In the example shown, robot 140 is a quadcopter drone. Accordingly, control engine 128 generates control signals 152 that modulate the thrust of one or more propellers to cause the drone to move sensor array 144 along trajectory 400(B). In another example, robot 140 could include an arm with a number of joints, similar to robot 140 shown in FIG. 3. In this case, control engine 128 could determine a set of joint articulations that would cause robot 140 to move sensor array 144 along trajectory 400(B). Again, those articulations need not be similar to the articulations of arm 300.

With the approach described herein, operator 114 indicates, via motion capture object 302, a trajectory along with sensor array 144 should travel. Control engine 128 then causes robot to trace a substantially similar trajectory with sensor array 144. During motion, sensor array 144 captures sensor data 154 for transmission to control engine 128.

Referring generally to FIG. 3-4, persons skilled in the art will understand that the techniques described above represent just two exemplary approaches for generating robot control signals based on motion capture data. Other approaches also fall within the scope of the invention. For example, the techniques described in conjunction with FIGS. 2 and 3 could be combined. According to this combined technique, control engine 128 could instruct robot 140 to copy the motions of operator 114 under certain circumstances, and to copy the trajectory of motion capture object 302 under other circumstances. Alternatively, control engine 128 could be trained to interpret the motions of operator 114 according to a gesture-based language. For example, operator 114 could perform specific hand motions to indicate camera operations such as "zoom in," "pan left," and so forth. With this approach, operator 114 may exercise fine-grained control over both the motions of robot 140 and more specific cinematographic operations. In one embodiment, control engine 128 records any and all movements performed by operator 114 during real-time control of robot 140 for later playback to robot 140. In this manner, robot 140 can be made to repeat a set of movements across multiple takes without requiring operator 114 to repeat the associated movements.

Procedure for Robot Control Via Motion Capture

Figure 5:
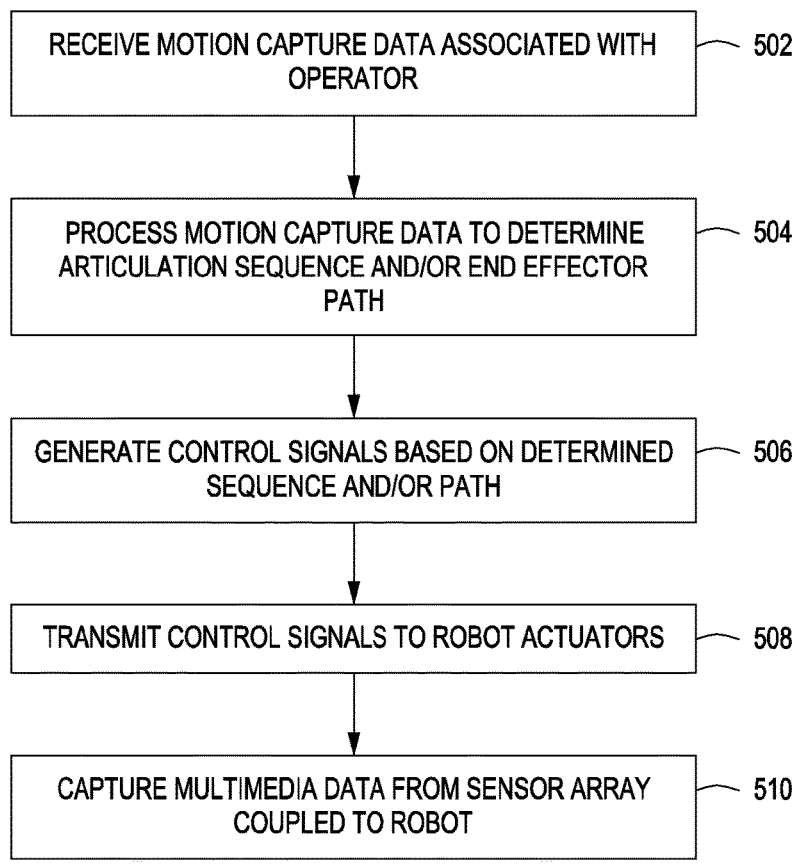
FIG. 5 is a flow diagram of method steps for translating motion capture data into control signals for a controlling a robot, according to various embodiments of the present invention.

FIG. 5 is a flow diagram of method steps for translating motion capture data into control signals for controlling a robot, according to various embodiments of the present invention. Although the method steps are described in conjunction with the systems of FIGS. 1-4, persons skilled in the art will understand that any system configured to perform the method steps, in any order, is within the scope of the present invention.

As shown, a method 500 begins at step 502, where motion capture setup 110 receive motion capture data associated with operator 114. Motion capture setup 110 may implement computer vision techniques to track head, body, and limb movements of operator 114, or rely on marking tracking techniques to track the movements of operator 114. Motion capture setup transmits motion capture signals 150 to control engine 128 for processing.

At step 504, control engine 128 processes motion capture signals 150 to determine an articulation sequence to be performed by robot 140 and/or an end effector path for robot 140 to follow. An example of an articulation sequence is discussed above in conjunction with FIG. 3. An example of an end effector path is described above in conjunction with FIG. 4.

At step 506, control engine 128 generates control signals 152 based on the determined articulation sequence and/or end effector path. Control signals 152 may vary depending on the type of robot 140 implemented. For example, to control a robotic arm of a robot, control signals 152 could include joint position commands. Alternatively, to control a robotic drone, control signals 152 could include motor speed commands for modulating thrust produced by a propeller.

At step 508, control engine 128 transmits control signals 152 to actuators 142 of robot 140. Control engine 128 may transmit control signals 152 via one or more physical cables coupled to robot 140 or transmit control signals 152 wirelessly.

At step 510, control engine 128 captures multimedia data from sensor array 144 coupled to robot 140. Sensor array 144 may include any technically feasible type of sensor configured to measure physical quantities, including an optical sensor, sonic sensor, vibration sensor, and so forth. In practice, sensor array 144 generally includes a video camera and potentially an audio capture device as well. Multimedia capture module 230 processes the sensor data from sensor array 144 to generate the multimedia data.

Persons skilled in the art will understand that although the techniques described herein have been described relative to various cinematographic operations, the present techniques also apply to robot control in general. For example, motion capture setup 110 and control engine 128 may operate in conjunction with one another to control robot 140 for any technically purpose, beyond filming movies.

In sum, a motion capture setup records the movements of an operator, and a control engine then translates those movements into control signals for controlling a robot. The control engine may directly translate the operator movements into analogous movements to be performed by the robot, or the control engine may compute robot dynamics that cause a portion of the robot to mimic a corresponding portion of the operator.

At least one advantage of the techniques described herein is that a human camera operator need not be subjected to discomfort or bodily injury when filming movies. Instead of personally holding camera equipment and being physically present for filming, the camera operator can simply operate a robot, potentially from a remote location, that, in turn, operates camera equipment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for controlling a robot to generate multi-media content, the method comprising:
    generating, via a first set of one or more sensors, motion capture data based on one or more movements of an operator;
    processing the motion capture data to generate control signals for controlling the robot, wherein a second set of one or more sensors is coupled to the robot;
    transmitting the control signals to the robot to cause the robot to mimic the one or more movements of the operator; and
    generating content associated with the one or more movements of the operator based on a plurality of image frames of the robot that are captured by the second set of one or more sensors.

2. The computer-implemented method of claim 1, wherein generating the motion capture data comprises tracking at least one of head, body, and limb movements associated with the operator via the first set of one more sensors.

3. The computer-implemented method of claim 1, wherein processing the motion capture data to generate the control signals comprises:
    modeling a first set of dynamics of the operator that corresponds to the one or more movements;
    determining a second set of dynamics of the robot that corresponds to the one or more movements; and generating the control signals based on the second set of dynamics.

4. The computer-implemented method of claim 1, wherein causing the robot to mimic the one or more movements of the operator comprises actuating a set of joints included in the robot to perform an articulation sequence associated with the one or more movements.

5. The computer-implemented method of claim 4, wherein the robot comprises a robotic arm that includes the set of joints.

6. The computer-implemented method of claim 1, wherein causing the robot to mimic the one or more movements comprises causing only a first portion of the robot to mimic only a subset of the one or more movements.

7. The computer-implemented method of claim 1, further comprising capturing sensor data while the robot mimics the one or more movements.

8. The computer-implemented method of claim 1, wherein the one or more movements comprise a target trajectory for the second set of one or more sensors coupled to the robot.

9. One or more non-transitory computer-readable media that, when executed by one or more processors, causes the one or more processors to control a robot in order to generate multi-media content, by performing the steps of:
generating, via a first set of one or more sensors, motion capture data based on one or more movements of an operator;
processing the motion capture data to generate control signals for controlling the robot, wherein a second set of one or more sensors is coupled to the robot;
transmitting the control signals to the robot to cause the robot to mimic the one or more movements of the operator; and
generating content associated with the one or more movements of the operator based on a plurality of image frames of the robot that are captured by the second set of one or more sensors.

10. The one or more non-transitory computer-readable media of claim 9, wherein generating the motion capture data comprises tracking at least one of head, body, and limb movements associated with the operator via the first set of one more sensors.

11. The one or more non-transitory computer-readable media of claim 9, wherein processing the motion capture data to generate the control signals comprises:
modeling a first set of dynamics of the operator that corresponds to the one or more movements;
determining a second set of dynamics of the robot that corresponds to the one or more movements; and
generating the control signals based on the second set of dynamics.

12. The one or more non-transitory computer-readable media of claim 9, wherein causing the robot to mimic the one or more movements of the operator comprises actuating a set of joints included in the robot to perform an articulation sequence associated with the one or more movements.

13. The one or more non-transitory computer-readable media of claim 9, wherein causing the robot to mimic the one or more movements comprises causing only a first portion of the robot to mimic only a subset of the one or more movements.

14. The one or more non-transitory computer-readable media of claim 9, further comprising capturing sensor data while the robot mimics the one or more movements.

15. The one or more non-transitory computer-readable media of claim 9, wherein the one or more movements comprise a target trajectory for the second set of one or more sensors coupled to the robot.

16. A system for controlling a robot to generate multi-media content, comprising:
a memory storing a control application; and
a processor coupled to the memory and configured to:
generate, via a first set of one or more sensors, motion capture data based on one or more movements of an operator,
process the motion capture data to generate control signals for controlling the robot, wherein a second set of one or more sensors is coupled to the robot,
transmit the control signals to the robot to cause the robot to mimic the one or more movements of the operator, and
generate content associated with the one or more movements of the operator based on a plurality of image frames of the robot that are captured by the second set of one or more sensors.

17. The system of claim 16, wherein the processor is configured to execute the control application to:
generate the motion capture data;
process the motion capture data to generate the control signals; and
transmit the control signals to the robot.

* * * * *